Oct. 25, 1966     M. L. QUIN     3,281,587
LIGHTING FIXTURE
Filed May 25, 1964     3 Sheets-Sheet 1

INVENTOR
MURRAY L. QUIN
BY
Gravely, Lieder & Woodruff
ATTORNEYS

Oct. 25, 1966  M. L. QUIN  3,281,587
LIGHTING FIXTURE

Filed May 25, 1964  3 Sheets-Sheet 2

INVENTOR
MURRAY L. QUIN
BY
Gravely, Lieder + Woodruff
ATTORNEYS

Oct. 25, 1966 M. L. QUIN 3,281,587
LIGHTING FIXTURE
Filed May 25, 1964 3 Sheets-Sheet 3

INVENTOR
MURRAY L. QUIN
BY
Gravely, Lieder & Woodruff
ATTORNEYS 3,281,587
LIGHTING FIXTURE
Murray L. Quin, Overland, Mo., assignor to Emerson Electric Co., St. Louis, Mo., a corporation of Missouri
Filed May 25, 1964, Ser. No. 369,769
8 Claims. (Cl. 240—47)

This invention relates to lighting fixtures and more particularly to luminaires having the heat generating elements in heat exchange relationship to unitary coolant source.

One of the more recent developments in the heating and lighting field is the utilization of radiant heating and cooling ceiling structures in conjunction with electric lamp fixtures or luminaires. The major function of the radiant heating and cooling ceiling in conjunction with lamp fixtures is the removal of heat from the lamps and balancing such heat with the demands for the entire room.

Generally, the radiant ceilings are supported from pipe laterals suspended from cross courses of furring channels. The necessary heat transfer for conditioning the enclosure is achieved between the pipe laterals which carry heating or cooling fluid and metal pans or panels which radiate or absorb thermal energy from the enclosure. The panels are generally of high heat conductivity material such as aluminum. The heat produced by light fixtures or luminaires is usually removed by providing high heat conductivity material in proximity to the heat generating elements of the fixture, the material transmits the absorbed heat into the radiation panels and into adjacent pipe laterials which convey a preconditioned fluid or heat transfer medium. For most efficient operation, such systems of heat removal from the luminaires usually have at least two pipe laterals active in removing heat as well as require the light fixture structures to be of high heat conductivity material.

The present invention avoids the difficulties and expense of prior techniques in providing lighting fixtures in conjunction with radiant panel ceilings which includes a relatively nominal amount of expensive high thermal conductivity material such as aluminum and copper to provide the desired result of heat removal from luminaires.

Briefly, the present invention provides a light fixture in which means in the fixture affords a high thermal conductivity heat-removal path to the lamps and ballasts and a single conduit carrying coolant. The lighting fixture is preferably thermally remote from any panels of the radiant panel ceiling and any cooling or heating fluid pipe laterals required for achieving the desired area conditioning.

In view of the above it is an important object of the present invention to provide a lighting fixture having a nominal amount of high thermal conductivity material therein to effect heat removal from lamps and ballast elements which material is adapted to encounter a single coolant channel to withdraw heat generated by such lamp and ballast, the fixture being maintained in poor thermal relation from parallel pipe laterals but may be supported therefrom.

It is another object of the invention to provide a lighting fixture having a troffer suspended from parallel pipe laterals but in poor thermal relation thereto that includes a ballast cover of a high thermal conductivity material which affords heat transfer means for removing heat from the lamps and ballast and transferring such heat into a liquid coolant conduit adjacent the troffer, the coolant conduit being thermally insulated in locations outside the troffer enclosure.

It is another object of the invention to provide a light troffer adapted to clamp around a single pipe lateral having a coolant fluid passing therethrough which is adapted to be supported in an aesthetic manner as a portion of a suspended radiant panel ceiling, the troffer clamping to said pipe lateral in high thermal conductivity relation for withdrawing heat from lamps and ballast elements associated with said lamps.

It is a further object of the invention to provide a lighting fixture for use in an aesthetic radiant panel ceiling which is made from relatively inexpensive material yet provides heat removal from the lamps and associated ballast elements directly into a liquid coolant by a metallic heat transfer body.

These and other objects and advantages of the invention will become apparent from the following description taken in conjunction with the drawings, wherein.

Figure 1:
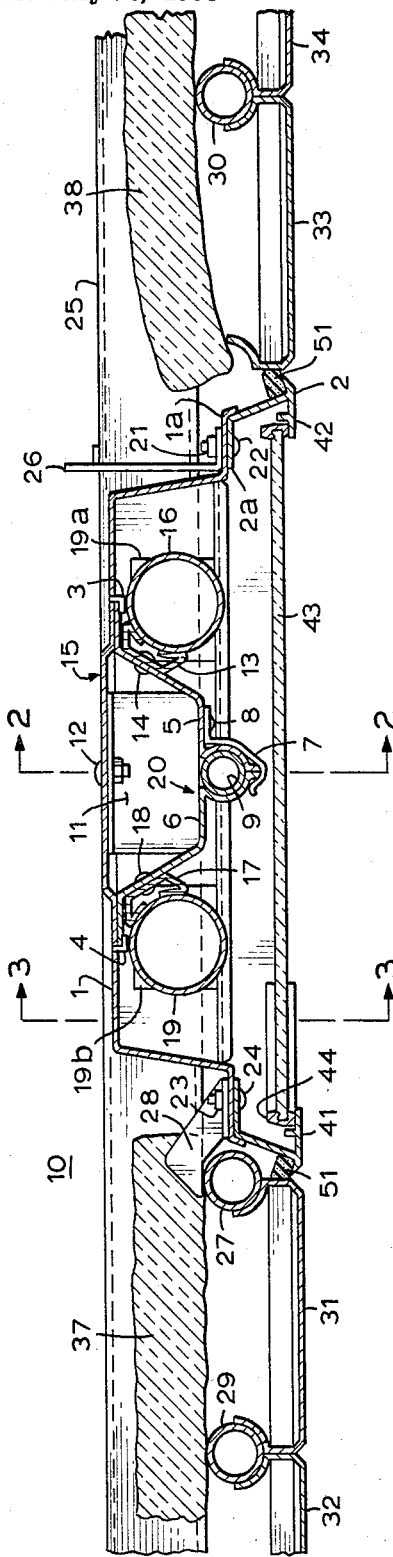
FIG. 1 illustrates a partially broken away cross section of a lighting fixture of the invention in conjunction with a radiant panel ceiling.
Figure 2:
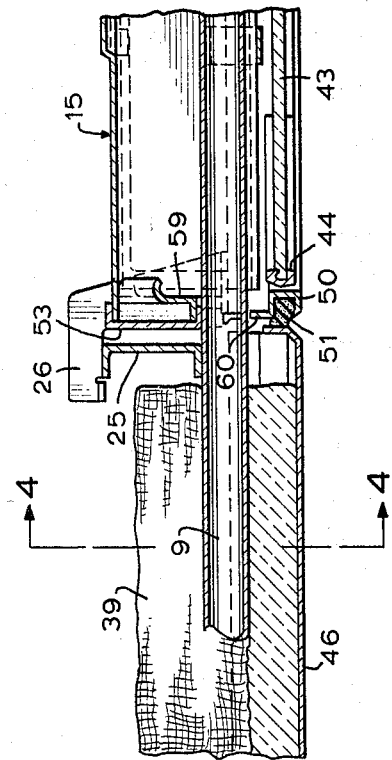
FIG. 2 is a cross sectional view taken along line 2—2 of FIG. 1 which depicts the troffer supported from a furring channel.
Figure 3:
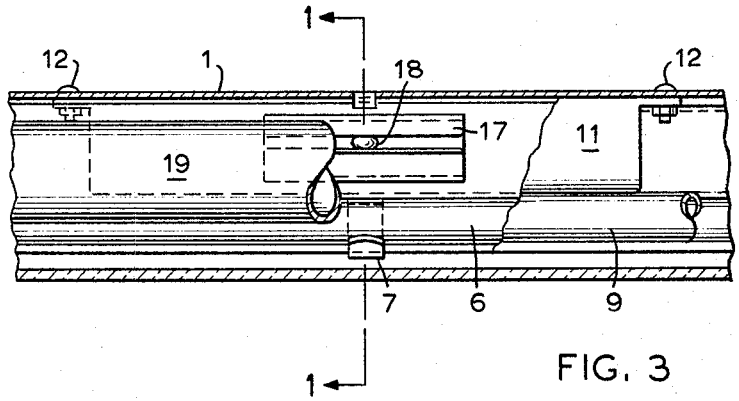
FIG. 3 is a longitudinal sectional view taken along the line 3—3 in FIG. 1.

Referring specifically to FIGS. 1, 2 and 3 there is illustrated one embodiment of the invention. The lighting fixture generally designated 10 is depicted as part of a ceiling which has a radiant panel conditioning system and includes a fixture housing 15 having an upper section 1 and a lower section 2.

Upper section 1 has mounting tabs 3 and 4 depressed therein which provides support for two part heat transfer member generally denoted 20 having right and left sectors 5 and 6 as viewed in FIG. 1. The heat transfer member 20 is substantially coextensive with the adjacent lamps and is usually painted white on the surface facing the lamps to avoid loss of light intensity throughout the fixture. A spring clamp 7, or several such clamps, attached to sector 5 by a rivet 8 provides a snap lock to hold sectors 5 and 6 encompassing liquid coolant conduit 9. Sectors 5 and 6 are maintained in intimate contact with ballast 11 mounted by a nut and bolt group 12 to upper section 1 of the housing 15. Sector 5 of member 20 has a lamp contact shoe 13, attached by a rivet 14, which is in thermal contact with lamp 16, suitably mounted by lamp holder 19a. Similarly, sector 6 of member 20 has lamp contact shoe 17, attached by rivet 18, which is in thermal contact with lamp 19, suitably mounted by lamp holder 19b. Although contact shoes 13 and 17 are illustrated against lamps 16 and 19, the contact shoes are optional and it will be understood that the number of contact shoes 13 and 17 used, if any, may vary depending on the liquid coolant temperature. At low coolant temperatures, radiation from lamps 16 and 19 into heat transfer member 20 is sufficient, whereas at warm coolant temperatures shoes 13 and 17 aid in maintaining optimum lamp operation. The shoes 13 and 17, and sectors 5 and 6 are preferably of high thermal conductivity material such as aluminum or copper, and provide the main heat removal path from lamps 16 and 19 and ballast 11, and these parts are the only ones which preferably are of high thermal conductivity. Thus, the other parts may be of low thermal conductivity.

The lower housing section 2 is attached to the upper section 1 along adjacent flanges 1a and 2a by captive nut 21 and bolt 22 at one side and captive nut 23 and bolt 24 at the other side. The furring channels 25 provide support for lighting fixture 10 by several pivotal brackets 26, each of which is attached to housing 15 by bolt 22 and captive nut 21. Brackets of the type shown at 26 are used since no pipe lateral is available. The other side of housing 15 is supported from a heating or cooling pipe lateral 27 by several pivotal brackets 28, each of which is attached to housing 15 by captive nut 23 and bolt 24. The bracket 28 is either of a thin metal section with very little heat transfer capability or a thermally insulated material. It will be understood that pivotal brackets 26 and 28 may be used interchangeably, yet where no pipe lateral is available bracket 26 affords a mounting means for the housing 15 from a furring channel. Note insulating inserts 51 introduces a poor thermal path between the housing and remaining areas of the radiant panel ceiling conditioning system. Other parallel pipe laterals 29 and 30 are shown supporting the remaining portions of the radiant panel ceiling conditioning system which include panels 31, 32, 33 and 34 supported from pipe laterals 29, 27 and 30. To provide most efficient heating and cooling for the radiant panel ceiling, insulation blankets 37 and 38 are provided overlying the pipe laterals 27, 29 and 30 in the plenum space above the radiant ceiling line. Also, lower section 2 of the housing provides longitudinal lips 41 and 42 to support light transmitting panel 43 along its protective edge mount 44 in a relatively quickly removal position.

FIG. 2 depicts an insulating blanket 39 which isolates liquid coolant conduit 9 from the radiant panel ceiling. Radiant panel 46 is adjacent end wall 50 but thermally separated by insulating insert 51 to avoid any heat transfer therebetween.

Referring to FIG. 3 there is illustrated the longitudinal view of lamp 19 mounted in housing 15. Lamp 19 is cut away to reveal contact shoe 17 and rivet 18, also clamp 7 may be seen which retains sector 6 of the heat transfer means firmly attached in thermal contact to liquid coolant conduit 9. Bolts and nuts 12 holding ballast 11 in housing 15 is best illustrated in FIG. 3 where a portion of sector 6 of heat transfer means 20 is cut away.

Figure 4:
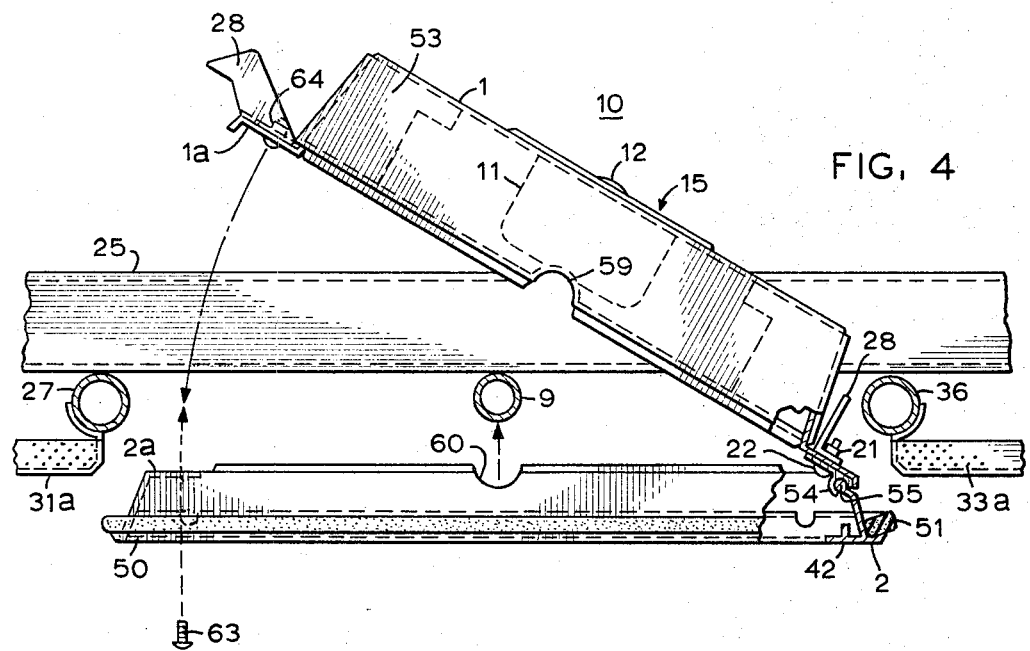
FIG. 4 is a sectional view taken along the line 4—4 in FIG. 2 modified to illustrate the upper and lower sectors of the troffer hinged together.

Referring now specifically to FIG. 4, a modified version of housing 15 as depicted in FIGS. 1, 2 and 3 is presented wherein like parts have like identifying numerals. The end walls 50 and 53 of housing 15 may be seen. Section 2 of housing 15 has a longitudinal side open socket 54 along one side which provides a pivotal connection with bead 55 in lower section 2 of housing 15. Upper section 1 has an end member 53 with notch 59 adapted with notch 60 in end member 50 to engage around liquid coolant conduit 9 containing flowing coolant. A bolt 63 fits a captive nut 64 held in flange 1a such that when the troffer 15 is maneuvered into place around liquid coolant channel 9, hinged sections 1 and 2 of the troffer may be secured in a fixed relation. Several bolts 63 are usually used. The assembly illustrated in FIG. 4, and likewise in FIG. 1, has pivotal brackets 28 for supporting the housing 15 from pipe laterals 27 or pivotal brackets 26 for supporting it from channel 25. Pipe lateral 36 and 27 support radiant panels 33a and 31a. Longitudinal lip 42 for supporting light transmitting panel 43 is also visible in FIG. 4.

Figure 5:
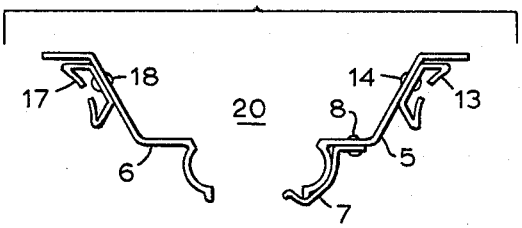
FIG. 5 depicts the ballast cover with lamp contacts and clamping lug adapted to attach the troffer to the pipe lateral.

Referring now to FIG. 5 there is illustrated heat transfer member 20, sectors 5 and 6. A spring shoe 7 is mounted by rivet 8 to sector 5. Optionally, as heretofore noted, sector 6 carries lamp contact shoe 17 attached by rivet 18, and lamp contact shoe 13 is attached to sector 5 by rivet 14. Sector 5 and 6 with or without optional contact shoe 13 and 17 provide substantially the entire heat transfer elements for removing heat from ballast 11 and lamps 16 and 19. All the parts of member 20 are preferably made from high conductivity material such as aluminum or copper.

Figure 6:
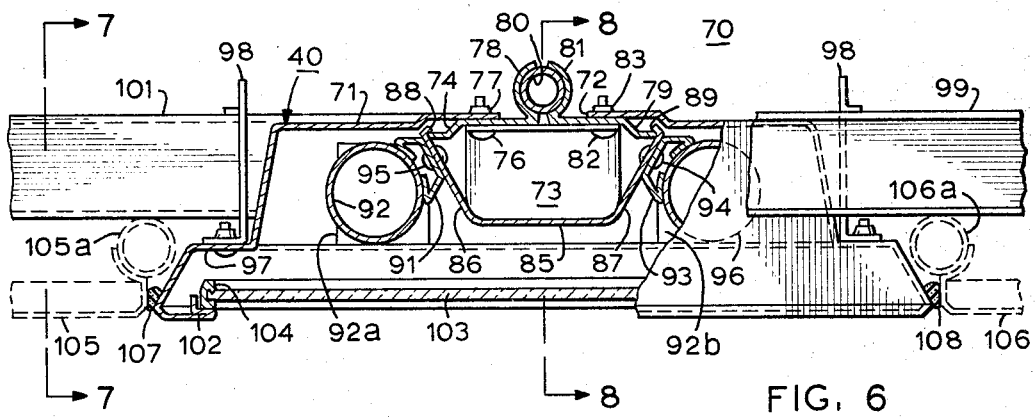
FIG. 6 illustrates an embodiment of the troffer associated with an overhead liquid coolant pipe lateral.

Referring now specifically to FIG. 6 there is illustrated another embodiment of the invention. A light fixture 70 including housing 40 is suspended below a coolant conduit. Housing 40 includes a unitary body section 71 which has a longitudinal slot or cut out area 72 in its upper portion. Attached to section 71 by bolt 76 and nut 77 is a heat conducting shoe or plate 74 which has a semi-circular portion 78 that surrounds one side of liquid coolant conduit 80. Also, attached to section 71 by bolt 82 and nut 83 is a heat conducting shoe or plate 79 which has section 81 similar to section 78 of shoe 74 which surrounds the other half of coolant conduit 80. The bolts and nuts supporting shoes 74 and 79 also retain ballast 73 in place. A single piece heat transfer member 85 is provided which is of similar design as two piece heat transfer member 20. Side walls 86 and 87 of member 85 terminate in hooks 88 and 89 respectively, which resiliently clamp to brackets 74 and 79, respectively. Side wall 86 has lamp contact shoe 91, attached by a rivet 95, thermally engaging lamp 92 supported by lamp holder 92a. Similarly side wall 87 carries lamp contact shoe 93, attached by rivet 94, thermally engaging lamp 96 supported by lamp holder 92b. Of course, contact shoes 91 and 93 are similar to 13 and 17 and are also optional as required to provide suitable lamp operation.

Section 71 of housing 40 has a step surface 97 at each side thereof which provides surfaces for pivotal mounting brackets 98 which support the housing from furring channel 99 at one end and furring channel 101 at the other end. Although only two brackets 98 are illustrated, preferably at least four would be utilized to support fixture 70. The lower edges of section 71 are bent inwardly and upwardly to provide seats 102 for translucent panel 103 which carries a protective edge mount 104. Housing 40 is insulated from radiant panels 105 and 106 (shown in phantom) and pipe laterals 105a and 105b (shown in phantom) by insulation 107 and 108, respectively.

Figure 7:
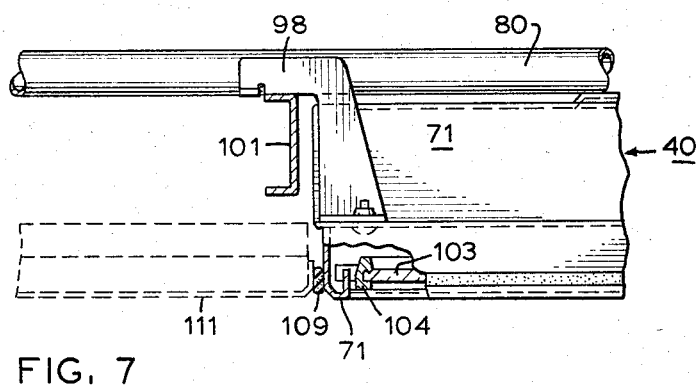
FIG. 7 is a cross sectional view taken along the line 7—7 of FIG. 6.

Referring now to FIG. 7 bracket 98 may be seen in contact with channel 101. Coolant conduit 80 along the portion including clamp 74 is not shown in the broken away view. The end wall of section 71 may be seen in FIG. 7 with a piece of thermal insulation 109 separating it from radiant panel 111 (shown in phantom).

Figure 8:
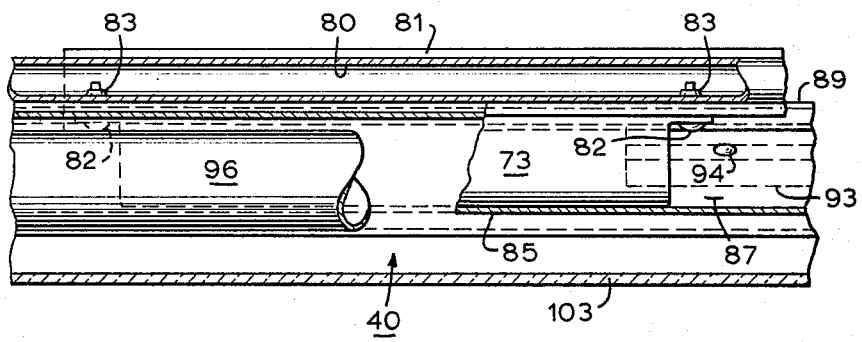
FIG. 8 is a cross sectional view taken along the line 8—8 of FIG. 6.

Referring to FIG. 8 there is illustrated a longitudinal view of housing 40. Lamp 96 mounted by lamp holder 92b, and the inner wall of coolant conduit 80 is exposed and illustrates section 81 of shoe or plate 79 coextensive with the wall thereof. Contact shoe 93 is hidden by wall 87. The hook area 89 of wall 87 may be seen. Translucent panel 103 is also visible. Plate 79 is shown with mounting bolts 82 and 83.

Inasmuch as heat transfer control between the heat generating means and the coolant conduit is of importance, it is contemplated that a troffer of low thermal conductivity may be employed. For example, plastic materials rather than metals may be used for housings 15 and 40.

It should be appreciated that the above invention has been disclosed with reference to several embodiments which will immediately suggest various modifications and changes to those skilled in the art. It is the intent that all such modifications and changes as will be recognized by those skilled in the art are within the scope and intent of the invention which is limited as necessitated solely by the appended claims.

What is claimed is:
1. A lighting fixture comprising a housing, heat generating means within said housing and separate therefrom, a heat transfer element carried within said housing in intimate thermal conductive contact with the heat generating means, and a source of coolant in heat transfer relationship directly with said heat transfer element, whereby the heat from said heat generating means flows directly toward the coolant source by conduction.

2. A lighting fixture having a housing designed for mounting as an aesthetic ceiling structure in conjunction with a radiant panel ceiling comprising a non-metallic troffer housing made of a relatively low thermal conductivity material, lamp means and associated ballast mounted within said troffer housing, a metallic heat conductive element fixed within said troffer housing in direct contacting heat transfer relationship with said lamp means and said ballast, and a metallic fluid carrying conduit independent of said troffer housing in intimate heat transfer contact with said heat conductive element.

3. In a lighting fixture, a housing composed of separable sections with complementary recesses therein, lamp means in said housing, electrical means in said housing connected with said lamp means, said lamp means and said electrical means constituting a source of heat, a heat dissipating fluid carrying conduit for said housing, said complementary recesses in said housing sections receiving said conduit therethrough in adjacency to said lamp means and electrical means, and heat transfer means detachably mounted within said housing in position to thermally couple said conduit and said electrical means to dissipate the electrical heat load through the fluid in said conduit, said heat transfer means being close to said lamp means to absorb heat by radiation therefrom.

4. The fixture set forth in claim 3 wherein said heat transfer means includes elements in physical contacting relation with said lamp means to effect heat transmission by conduction.

5. In a ceiling radiant panel area conditioning and lighting system, a light fixture comprising an inverted channel-shaped pan body having flanges on at least two opposite edges and defining an elongated central opening, a clamp member attached to the body coextensive with the central opening and projecting out of the central opening to engage a coolant conduit, lighting means including heat generating parts mounted within the pan body, and a heat transfer member attached within the pan body to the clamp member and in heat absorbing proximity to the heat generating parts, a frame holder attached to said flanges, a light transmitting panel mounted within said frame holder, and hanger members attached to the pan body at said flanges for supporting the light fixture within the system.

6. The light fixture of claim 5 wherein the heat transfer member defines ridge elements for mounting to the clamp member and the clamp member includes two complementary pieces each having an arcuate face surface engaging part of the coolant conduit and a hook element to engage complementary ridge elements of the heat transfer member.

7. In a ceiling structure for a room to be lighted and cooled by radiant energy transmission; the improvement of a lighting fixture carried by the ceiling structure and comprising a fixture section composed of a downwardly opening pan body having depending side and end walls and a top wall, said top wall being light reflective; lamp means mounted in said pan body spaced from said reflective top wall; electrical means in said fixture to energize said lamp means; a second fixture section composed of a frame, and a light transparent panel secured to said frame, said frame locating said panel over the downwardly opening pan body for light diffusion into the room; means in the ceiling structure for radiantly cooling the room, including a series of pipes carrying a liquid, cooling medium; first means on said fixture to connect it into the ceiling structure between spaced pipes; insulating means on said fixture to thermally isolate said fixture from said spaced pipes; and metallic means secured to said top wall and includes heat energy conducting surfaces engaging at least one pipe from opposite sides for transmission of heat energy by conduction into said one pipe, said electrical means being in contact with said metallic means to give up heat energy thereto by conduction and said lamp means being in radiation heat energy transmission relation with said metallic means.

8. In a ceiling structure for a room to be lighted and cooled by radiant energy transmission; the improvement of a lighting fixture carried by the ceiling structure and comprising a fixture section composed of a downwardly opening pan body having depending side and end walls and a top wall, said top wall being light reflective; lamp means mounted in said pan body spaced from said reflective top wall; electrical means in said fixture to energize said lamp means; a second fixture section composed of a frame, and a light transparent panel secured to said frame, said frame locating said panel over the downwardly opening pan body for light diffusion into the room; means in the ceiling structure for radiantly cooling the room, including a series of pipes carrying a liquid, cooling medium; first means on said fixture to connect it into the ceiling structure between spaced pipes; metallic means secured to said top wall and engaging at least one pipe for transmission of heat energy by conduction into said one pipe, said electrical means being in contact with said metallic means to give up heat energy thereto by conduction; and a lamp contact element connected to said metallic means to transmit lamp heat by conduction into said metallic means, and said lamp means being also in radiation heat energy transmission relation with said metallic means.

References Cited by the Examiner

UNITED STATES PATENTS

| | | | |
|---|---|---|---|
| 2,591,661 | 4/1952 | McCandless | 240—51.11 X |
| 2,710,336 | 6/1955 | Jorn | 240—47 X |
| 2,924,436 | 2/1960 | Baran | 240—47 X |
| 3,090,434 | 5/1963 | Benson et al. | 240—47 X |
| 3,193,001 | 7/1965 | Meckler | 240—47 X |

FOREIGN PATENTS 483,628   8/1963   Italy.

NORTON ANSHER, *Primary Examiner.*

C. R. RHODES, *Assistant Examiner.*